United States Patent [19]

Branton

[11] 4,261,017

[45] Apr. 7, 1981

[54] ELECTRON BEAM INFLUENCING APPARATUS

[75] Inventor: Tom W. Branton, Lancaster, Pa.

[73] Assignee: RCA Corporation, New York, N.Y.

[21] Appl. No.: 107,589

[22] Filed: Dec. 27, 1979

[51] Int. Cl.[3] ........ H04N 5/645

[52] U.S. Cl. ........ 358/248; 335/212

[58] Field of Search ........ 358/248, 249; 335/210, 335/212

[56] References Cited

U.S. PATENT DOCUMENTS

| | | | |
|---|---|---|---|
| 3,410,955 | 11/1968 | Mackey | 358/248 |
| 3,582,848 | 6/1971 | Ryder | 335/212 |
| 3,629,751 | 12/1971 | Massa | 335/210 |
| 3,725,831 | 4/1973 | Barbin | 335/212 |
| 4,016,363 | 4/1977 | Deal | 358/248 |
| 4,030,126 | 6/1977 | Puhak | 358/248 |
| 4,050,042 | 9/1977 | Anthony | 358/249 |
| 4,060,836 | 11/1977 | Corbeij | 358/248 |
| 4,095,260 | 6/1978 | Suzuki | 358/248 |
| 4,151,561 | 4/1979 | Kratz | 358/248 |

*Primary Examiner*—Howard W. Britton
*Attorney, Agent, or Firm*—Eugene M. Whitacre; William H. Meagher; Scott J. Stevens

[57] ABSTRACT

An electron beam influencing apparatus comprises a deflection yoke which incorporates a kinescope neck-embracing collar which extends from the rear of the yoke. The collar extends over a portion of a slidably mounted sleeve. Permanent magnet neck components are rotationally mounted to the sliding sleeve. The collar and sleeve are formed so that the yoke and collar rotates independently of the sleeve, but longitudinal movement of the yoke and collar will cause longitudinal movement of the sleeve also. A single clamp is used to secure the collar and sleeve to the tube neck. The collar may be attached to a yoke adjustment plate which allows pivotal or transverse yoke motion while maintaining stationary positioning of the adjustment plate.

3 Claims, 1 Drawing Figure

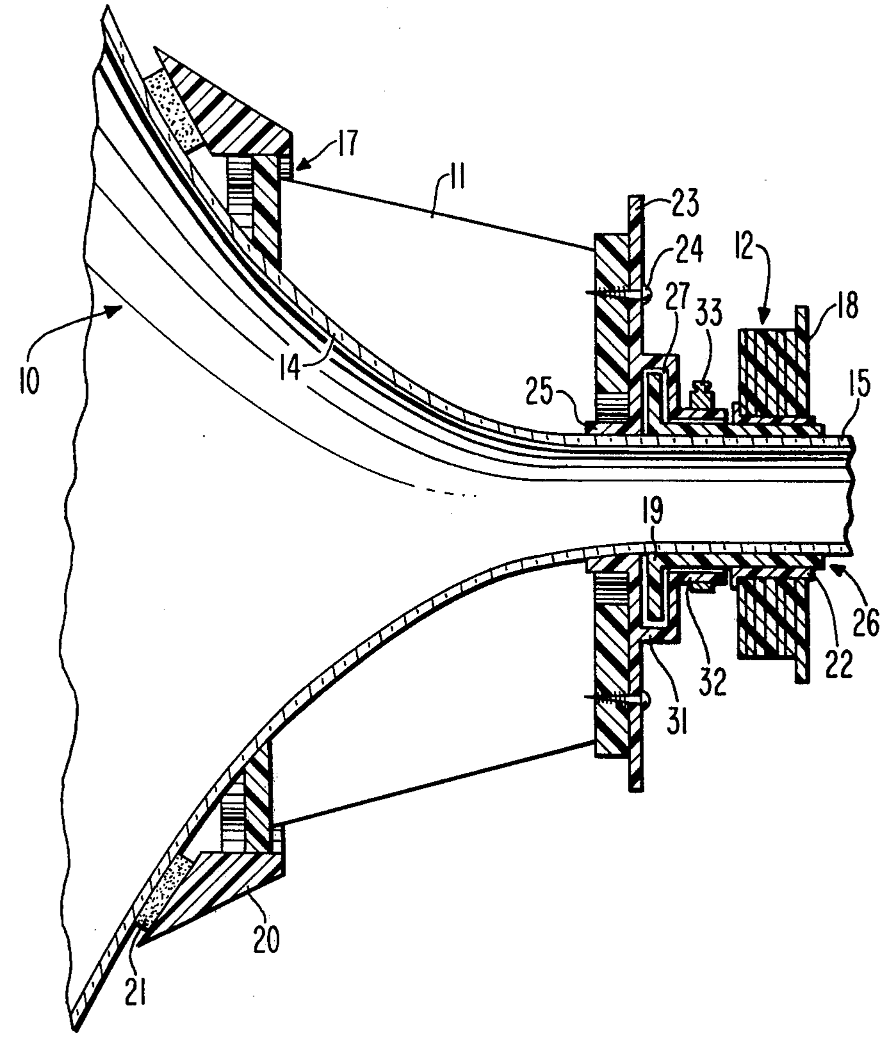
17
11
23
24
12
18
27
33
10
14
25
15
19
26
32
22
31
20
21

ELECTRON BEAM INFLUENCING APPARATUS

This invention relates to an electron beam influencing apparatus for use with a color kinescope which incorporates a unique mounting arrangement.

Conventional color television receivers now contain deflection yokes which can substantially converge the three electron beams at all locations on the kinescope display screen without the need for dynamic convergence circuits. Adjustment for optimum raster purity and minor corrections for convergence can be made by optimizing the position of the yoke with respect to the electron beams. Multipole permanent magnets mounted to the kinescope neck are used to statically converge the three beams at the center of the screen.

A common procedure for adjusting the deflection yoke and tube neck components for best overall purity and beam convergence is to first converge the beams at the center of the screen by adjusting the magnetic neck components. Optimum purity is achieved by moving the yoke longitudinally along the tube neck. Best corner convergence of the electron beams is then accomplished by moving the yoke transversely with respect to the tube neck. It is important that once center convergence is achieved, further adjustments do not disrupt the position of the magnetic neck components. U.S. Pat. No. 3,725,831—Barbin, discloses magnetic neck components that are used to achieve center convergence of the electron beams.

In order to reduce the length of the tube neck needed for mounting the deflection yoke and magnetic neck components, it would be desirable to form an integral yoke-neck component assembly. This would eliminate the clamp necessary to mount the neck components to the tube, hence shortening the length of tube neck needed. The advantage of this is that the picture tube can then be shortened, reducing tube manufacturing costs. By using a shorter tube, the depth of the receiver cabinet could be reduced, again cutting manufacturing costs. Packaging and shipping costs would likewise be reduced.

The disadvantage of such integral assembly is that, as previously stated, the position of the neck components should not be disturbed once center convergence of the beams is achieved. Unless yoke motion independent of the neck components is allowed, any unitary yoke-neck component assembly would be unacceptable. The present invention is directed to an electron beam influencing apparatus for use with a color kinescope. The apparatus comprises a deflection yoke and an annular magnetic beam convergence structure. In accordance with the invention, the beam convergence structure is mounted on a sleeve, which is slidably disposed on the kinescope neck. A housing, mounted to the deflection yoke, encloses a portion of the mounting sleeve allowing rotation of the yoke independent of the sleeve and causing dependent movement of the sleeve in response to longitudinal movement of the yoke.

The accompanying drawing is a cross-sectional side elevational view of a color television kinescope assembly incorporating the electron beam influencing apparatus of the present invention.

Referring to the drawing, there is shown a color television picture tube assembly comprising a kinescope or picture tube 10, a deflection yoke 11 and a magnetic beam convergence structure or neck components 12. The kinescope 10 comprises a glass envelope made up of a rectangular substantially flat front panel (not shown), a tapered funnel region 14 and a narrow neck region 15, having a circular cross section. An electron gun assembly (not shown) is mounted within the neck region 15 at the kinescope end opposite the front panel. The gun assembly incorporates three horizontal in-line electron guns which produce the electron beams which illuminate the red, green and blue phosphor regions on the kinescope display screen. The display screen is is formed as a phosphorescent coating on the inside of the front panel.

Deflection yoke 11 comprises vertical and horizontal deflection coils (not shown) for deflecting the electron beams across the display screen. The front of deflection yoke 11 is disposed within a front yoke support 17 and is secured by way of a clamp (not shown). Front yoke support 17 is mounted to the funnel region 14 of kinescope 10. Front yoke support member 17 comprises a plurality of mounting feet 20. Adhesive pads 21, mounted to the feet 20, attach directly to the outside of the kinescope 10. The thickness of the pads 21 provide a flexible mount for the deflection yoke 11. The support member 17 allows the yoke 11 to move rotationally and longitudinally by releasing the clamp. The back end of yoke 11 is mounted to yoke adjustment plate 23 by screws 24. The central aperture of the back of yoke 11 is dimensioned such that the back of yoke 11 may be moved transversely with respect to the neck region 15 of the kinescope 10 when screws 24 are loosened. Such movement of the back of yoke 11 causes the deflection yoke 11 to pivot about the attachment points at the front of the yoke. Movement of the yoke in this manner aids in the optimization of the convergence of the electron beams on the kinescope display screen. A yoke mounting arrangement of this type is disclosed in U.S. Pat. No. 4,151,561—Kratz, et al.

The yoke adjustment plate 23 also comprises a plurality of neck-embracing fingers 25 surrounding the central neck-receiving aperture of adjustment plate 23. Fingers 25 hold the adjustment plate 23 against the kinescope neck 15 resiliently, allowing rotational or longitudinal motion of plate 23 on neck 15, but preventing any transverse movement of plate 23 with respect to neck 15. Plate 23 will then remain stationary while yoke 11 is moved transversely with respect to neck 15.

Magnetic neck components 12 comprise pairs of circular multipole magnets which are adjusted to provide static convergence of the electron beam at the center of the display screen. The operation of such magnets is described in U.S. Pat. No. 3,725,831—Barbin. Other externally mounted static convergence devices may also be used. Neck components 12 are mounted to a beaming surface 22 which allows rotation of the magnetic rings. A threaded fastener 18 holds the rings on the beaming surface 22. The beaming surface 22 is then mounted to a flexible sliding sleeve 26 which fits around the neck 15 of kinescope 10. Beaming surface 22 of the neck components 12 is attached to sleeve 26 through adhesive or other means and holds the neck components 12 securely in place on sleeve 26. The individual magnetic rings of the neck components 12 are free to rotate about the neck 15 in the normal manner to provide electron beam static convergence. One end of sleeve 26 forms a flanged portion 19.

The neck components 12 and sleeve 26 are mounted to the kinescope neck in the following manner. Attachment member 31 extends from adjustment plate 23 toward the electron gun end of kinescope 10. The cylindrical sides of attachment member 31 extend parallel to neck 15 from plate 23 at a slight distance from the neck 15 of kinescope 10. At a short distance from plate 23, the walls of attachment member 31 angle sharply toward neck 15, forming an annular region 27 defined by the walls of attachment member 31 and the kinescope neck 15. The flanged portion 19 of sleeve 26 resides within the annular region 27. During manufacture, attachment member 31 may be bent or deformed to allow flange 19 to enter annular region 27. Attachment member 31 terminates with a flexible collar 32 which extends along and fits around kinescope neck 15. Collar 32 fits over neck component sleeve 26. A clamp 33 is mounted over collar 32 in the area where collar 32 fits over sleeve 26. Clamp 33 can be tightened to deform collar 32 and sleeve 26 against the kinescope neck 15. Tightening clamp 33 securely attaches yoke 11 and neck components 12 to the kinescope neck 15.

With clamp 33 and the clamp on front yoke support 17 loosened, adjustment plate 23, and hence yoke 11, can be rotated to align the scanned raster with the display screen axes without disturbing the position of the neck component magnets, since collar 32 can rotate without moving sleeve 26. The yoke 11 can also be moved axially along the neck 15 to optimize raster purity, while maintaining the desired distance between the yoke 11 and neck component 12, since the flanged portion 19 of sleeve 26 which is within the annular region 27 allows the sleeve 26, and hence neck component 12, to move axially in conjunction with yoke 11. When the desired position of the yoke 11 is found, clamp 33 can be tightened to securely lock the yoke 11 and neck component 12 against the kinescope neck 15.

The above-described arrangement for securing the yoke and neck components to the tube neck has the advantage over previous means of attachment in that it reduces the number of clamps necessary to secure the yoke and neck components to the kinescope neck. Previously, separate clamps were needed to secure the yoke and neck components to the tube neck, in order to maintain independent adjustments.

What is claimed is:

1. In combination with a color kinescope having a neck and a funnel portion, an electron beam influencing apparatus comprising:

- a yoke support secured to said funnel portion of said kinescope;
- a deflection yoke having a front end received by said yoke support in a manner permitting pivotal, rotational and longitudinal motion of said yoke;
- a flexible mounting sleeve slidably disposed along said kinescope neck;
- an annular magnetic beam convergence structure secured to said sleeve;
- a flexible yoke mounting collar mounted to the back of said yoke; said collar embracing a portion of said sleeve in a manner allowing independent rotational movement of said collar with respect to said sleeve while assuring dependent movement of said sleeve in response to longitudinal movement of said yoke along said kinescope neck; and
- a clamp, disposed about said collar, for selectively fixing the positions of said yoke and said beam convergence structure on said kinescope neck.

2. The beam influencing apparatus defined in claim 1, wherein said beam convergence structure comprises a plurality of beam bender magnets.

3. The beam influencing apparatus defined in claim 1, wherein said yoke mounting collar is formed as a portion of a yoke adjustment plate, said plate releasably mounted to the back of said yoke for allowing pivotal movement of said yoke with respect to said kinescope neck.

* * * * *